United States Patent [19]
Shinohara

[11] Patent Number: 5,833,878
[45] Date of Patent: Nov. 10, 1998

[54] LIQUID CRYSTAL DISPLAY PANEL

[75] Inventor: Hironobu Shinohara, Tokyo, Japan

[73] Assignee: JSR Corporation, Tokyo, Japan

[21] Appl. No.: 954,028

[22] Filed: Oct. 20, 1997

Related U.S. Application Data

[63] Continuation of Ser. No. 601,520, Feb. 14, 1996, abandoned.

[51] Int. Cl.$^6$ .......................... C09K 19/52; G02F 1/1335; G02F 1/1337
[52] U.S. Cl. .................... 252/299.01; 252/299.5; 349/62; 349/87; 349/106; 428/1
[58] Field of Search ............... 252/299.01, 299.5; 428/1; 349/62, 87, 106

[56] References Cited

U.S. PATENT DOCUMENTS

| | | |
|---|---|---|
| 5,164,469 | 11/1992 | Goto et al. . |
| 5,334,424 | 8/1994 | Hani et al. . |
| 5,399,646 | 3/1995 | Kohara et al. . |
| 5,516,456 | 5/1996 | Shinohara et al. .................. 252/299.01 |

FOREIGN PATENT DOCUMENTS

| | | |
|---|---|---|
| 0 587 890 A1 | 3/1994 | European Pat. Off. . |
| 0 591 536 A1 | 4/1994 | European Pat. Off. . |
| 5-61026 | 3/1993 | Japan . |
| 5-212828 | 8/1993 | Japan . |
| 6-51117 | 2/1994 | Japan . |

OTHER PUBLICATIONS

Derwent Abstract of JP 21–96,832, 1990.
Derwent Abstract of JP 21–80,976, 1990.
Derwent Abstract of JP 63–234,201, 1988.
Derwent Abstract of EP 3 84,964, 1990.
Derwent Abstract of WO–93–02,381, 1993.

*Primary Examiner*—Shean C. Wu
*Attorney, Agent, or Firm*—Oblon, Spivak, McClelland, Maier & Neustadt, P.C.

[57] ABSTRACT

This invention relates to a liquid crystal display panel comprising a structural element having therein at least two functions such as, e.g., a transparent conducting film, a protective film for a polarizing film, a phase retardation film, a color filter, a light guide sheet, a light diffusion sheet, and a light condensing sheet, wherein the at least two functions of said structural element are performed by a sheet or film and said film is constituted of a thermoplastic resin having norbornane repeat units. This liquid crystal display panel permits practical use of films with a plurality of liquid crystal display panel functions that have not been used in practice by the conventional plastic films, by using films having high optical properties, heat resistance, moisture resistance, dimensional stability, moldability, and mechanical strength, resulting in the ability to reduce the number of films needed, the formation of a thinner and reduced weight panels, and in addition providing excellent display image sharpness.

12 Claims, No Drawings

LIQUID CRYSTAL DISPLAY PANEL

This application is a Continuation of application Ser. No. 08/601,520, filed on Feb. 14, 1996, now abandoned.

BACKGROUND OF THE INVENTION

The present invention relates to a liquid crystal display panel comprising a plastic film, in particular to a liquid crystal display panel which provides a sharper image, weight reduction, and a thinner construction, by reducing the number of structural films required by using one or more films having a plurality of functions.

Liquid crystal displays are typically constructed from many films or sheets ("films" includes both films and sheets hereafter) each having individually different functions, such as liquid crystallinity, liquid crystal orienting ability, transparency, polarizing ability, phase retardation ability, light condensing ability, light diffusion ability, light guiding ability, light reflecting ability, and the like. The use of a large number of films has made LCD assembling steps complicated. This results in a limited ability to reduce cost. Increasing the number of laminated layers has reduced light transmittance, thereby darkening the image, so that there has been much demand for a reduction in the number of sheets used.

As a way of trying to reduce the number of films needed for constructing an LC display, attempts have heretofore been made to reduce the number of films used by letting a single sheet of film perform two or more of the above functions; for example, the following have been disclosed: polarizing films obtained by laminating protective films to both sides of a polarizing membrane in which at least one of the protective films has a phase retardation function obtained by uniaxial stretching, or the like, as in Japanese Patent Laid Open SHO 58-98709, HEI 4-305602, HEI 4-371903, and the like; transparent conducting polarizing films obtained by forming a transparent conducting membrane on the protective film for the polarizing membrane at a side opposite to the side laminated to the polarizing membrane as in Japanese Patent Laid Open SHO 57-24904, SHO 63-113422, and HEI 1-283504, and the like.; and transparent conducting films having phase retardation functions obtained by forming a transparent electrode ("transparent electrode" may also be called as "transparent conducting film" or "transparent conducting layer" hereafter) on top of a phase retardation film, as in Japanese Patent Laid Open HEI 4-256922, respectively.

However, these films for liquid crystal display panels in which a single sheet of film performs a plurality of functions which are disclosed in these specifications are plagued with a variety of problems originating from the resins used, so that it has been extremely difficult in practice to obtain a high quality liquid crystal display panel by combining these films. For example, the above publications disclose transparent materials that are preferred as film materials, such as polycarbonate resins (PC), triacetyl cellulose (TAC), polymethyl methacrylate resins (PMMA), polyimide resins (PI), polyester resins such as polyethylene terephthalate resins (PET) and the like, aromatic polyester resins, such as polyarylate resins (PAR) and the like, polyether sulfone resins (PES) and the like; but PC, which has a coefficient of photoelasticity as high as about $9 \times 10^2$ cm$^2$/dyne, is deficient in that it has a too high and nonuniform birefringence and is susceptible to change caused by even slight stresses during assembling or in the environment, and requires careful handling because it has low surface hardness which makes it liable to be damaged during film manufacture or during processing to impart functions such as stretching, lamination, coating formation, or the like, thus suffering from poor productivity.

TAC and PMMA which are deficient in heat resistance and moisture resistance have shown deterioration in their function due to distortion with the heat used in imparting the functions, such as the formation of a transparent electrode or a pattern formation with a thermoset resin or the like, or due to absorption of ambient moisture during their handling.

PET, a crystalline polymer, is deficient in that it tends to generate a high birefringence, is insufficient in heat resistance, is poor in adhesion to a functional coated film such as a transparent electrode, a patterned membrane, or the like, resulting in the penetration of water between the films in use, which results in film degradation. PI, a thermoset resin, has a limited degree of freedom in film formation and is deficient in many aspects because the resultant film is often colored, adversely affecting the view of the image if used in liquid crystal display panel applications. Similarly, clarity so that these have been unsuitable for use in liquid crystal display panel applications which require stringent optical properties.

In addition, making a single film have a plurality of functions requires applying more processing steps, such as stretching, laminating, film forming, surface treating, and the like certainly to a greater extent than for the above single-function liquid crystal display panel films; thus films with good heat resistance, moisture resistance, dimensional stability, and mechanical strength are required but it is extremely difficult to produce a film that meets all of these required properties using conventional transparent resins.

Therefore, it has been practically impossible to commercialize a technology that provides a thinner and lighter-weight liquid crystal display panel by letting a single film perform a plurality of functions in a liquid crystal display panel.

OBJECTS OF THE INVENTION

An objective of this invention is to provide a film having high optical characteristics, heat resistance, moisture resistance, dimensional stability, moldability, and mechanical strength, so as to enable a single film to perform a plurality of liquid crystal display panel functions, and thereby to provide a thinner and reduced weight liquid crystal display panel by reducing the number of sheets or films used.

SUMMARY OF THE INVENTION

The liquid crystal display panel of this invention is a liquid crystal display panel comprising a structural element providing at least two liquid crystal display functions such as transparent conductivity, protection for, e.g., a polarizing film, phase retardation, color filtering, light guiding, light diffusion, light condensing, etc. wherein said structural element comprises a thermoplastic resin having one or more norbornane units.

DETAILED DESCRIPTION OF THE INVENTION

The thermoplastic resin which is used in this invention comprises one or more types of norbornane units in its recurring units. For example, the invention thermoplastic resin may contain one or more norbornane units represented by General formulas I–IV:

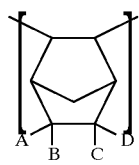
[General formula I]

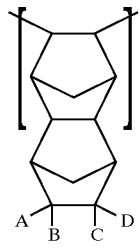
[General formula II]

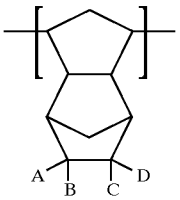
[General formula III]

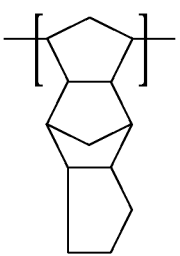
[General formula IV]

wherein, A, B, C, and D represent hydrogen atoms or monovalent organic groups.

The thermoplastic resins having norbornane skeletons that can be used in this invention include resins, for example, described in U.S. Patent No. 5,283,115, U.S. Pat. No. 5,516,456 and Japanese Patent Laid Open SHO 60-168708, SHO 62-252406, SHO 62-252407, HEI 2-133413, SHO 63-145324, SHO 63-264626, HEI 1-240517, and SHO 57-8815, all incorporated herein by reference.

The invention thermoplastic resin also includes, for example, a hydrogenated polymer obtained by hydrogenating a polymer resulting from metathesis polymerization of at least one tetracyclododecene derivative represented by General formula V below or of said tetracyclododecene with a copolymerizable unsaturated cyclic compound.

[General formula V]

wherein, A–D are as defined previously.

The invention resins can be homopolymers or copolymers, and if copolymers preferably contain at least 5, 10, 20, 30, 40, 50, 60, 70, 80, 90 or 95% by weight of at least one norbornane unit of formulae I–V above with the remainder being derived from other copolymerizable monomers such as unsaturated cyclic compounds. In preferred embodiments, variable A–D of formulae I–V individually represent hydrogen, Cl-10 hydrocarbon, halogen, halogen-substituted Cl-10 hydrocarbon, $-(CH_2)_n COOR^1$, $-(CH_2)_n OCOR^1$, $-(CH_2)_n OR^1$, $-(CH_2)_n CN$, $-(CH_2) CONR^3 R^2_1$, $-(CH_2)_n COOZ$, $-(CH_2)_n OCOZ$, $-(CH_2)_n OZ$, or $-(CH_2) W$, and B and C together may be $-OC-O-CO-$, $-OC-NR^4-CO-$, or form a (poly) cyclic $C_3-C_{30}$ alkylene group; $R^1$, $R^2$, $R^3$, and $R^4$ are Cl-20 hydrocarbon; Z is a halogen-substituted Cl-20 hydrocarbon group; W is $SiR^5_p X_3\text{-p}$ where $R^5$ is a Cl-10 hydrocarbon group; X is a halogen atom or $-OCOR^6$ or $-OR^6$ where $R^6$ represents a Cl-10 hydrocarbon group, p is an integer of 0–3; and n is an integer of 0–10.

It is preferred that in the tetracyclododecene derivative represented by the above General formula V, that a polar group is present in either A, B, C, or D in terms of heat resistance and the adhesion to a colored layer. It is also preferred that the polar group be a group represented by $-(CH_2)n COOR^1$ (where $R^1$ is a Cl-20 hydrocarbon group and n is an integer of 0–10) because the resultant hydrogenated polymer will have a high glass transition temperature.

Particularly, it is preferred that one polar substituent group represented by the $-(CH_2)n COOR^1$ be present in each molecule of the tetracyclododecene derivative of General formula V.

$R^1$ in the above formula is a Cl-20 hydrocarbon group where the greater the number of carbon atoms, the better it is because of the lower moisture absorption of the hydrogenated polymer. However, in terms of a balance with the glass transition temperature of the resultant hydrogenated polymer, it is preferably a Cl-4 linear alkyl group or a (poly) cyclic alkyl group with five or more carbon atoms, particularly a methyl group, ethyl group, and cyclohexyl group.

Further, tetracyclododecene derivatives of General formula V in which the carbon atom to which a carboxylate ester group is bonded, has a Cl-10 hydrocarbon group as the substituent group are preferred because moisture absorption is reduced. A tetracyclododecene derivative of General formula V in which the substituent is methyl group or ethyl group is particularly preferred because its synthesis is easier. Specifically, 8-methyl-8-methoxy carbonyl tetracyclo [$4.4.0.1^{2,5}.1^{7,10}$] dodeca-8-ene is preferred.

These tetracyclododecene derivatives or mixtures thereof with copolymerizable unsaturated cyclic compounds can be subjected to metathesis polymerization and then hydrogenation according to a procedure disclosed, for example, in Japanese Patent Laid Open HEI 4-77520 (incorporated herein by reference) on page 4, right upper column, line 12 to page 6, the right bottom column, line 6, to be converted into thermoplastic resins which are used in this invention.

The above hydrogenated polymer preferably has a glass transition temperature (Tg) in the range of 100°–250° C., particularly in the range of 120°–200° C. A level less than 100° C. will mean that molded articles from such a resin composition will be poor in heat resistance. A resin with its Tg exceeding 250° C. will have a high molding temperature so that the resin may be scorched or discolored, thereby making it difficult to obtain a high quality molded article.

The extent of hydrogenation of the above hydrogenated polymer as measured by $^1$H-NMR at 60 MHz should be at least 50%, preferably at least 90%, more particularly at least 98%. The higher the extent of hydrogenation, the more superior the stability against heat or light.

The hydrogenated polymer which is used as a thermoplastic resin having norbornane skeletons in this invention preferably has a gel content of the hydrogenated polymer to be not more than 5% by weight, in particular not more than 1% by weight.

The thermoplastic norbornane-type resin which is used as a transparent substrate board material in this invention may be optionally compounded with known antioxidants in an amount within the range of not adversely affecting this invention, such as: 2,6-di-t-butyl-4-methyl phenol; 2,2'- dioxy-3,3'-di-t-butyl-5,5'-dimethylphenyl methane; tetrakis [methylene-3-(3,5-di-t-butyl-4-hydroxyphenyl)propionate] methane; 1,1,3-tris(2-methyl-4-hydroxy-5-t-butylphenyl) butane; 1,3,5-trimethyl-2,4,6-tris(3,5-di-t-butyl-4-hydroxybenzyl)benzene; stearyl-β-(3,5-di-butyl-4-hydroxyphenyl)propionate; 2,2'-dioxy-3,3'-di-t-butyl-5,5'-diethylphenylmethane; 3,9-bis[1,1-dimethyl-2-[β-(3-t-butyl-4-hydroxy-5-methylphenyl)propionyloxy] ethyl]; 2,4,8,10-tetraoxyspiro[5,5]undecane; tris (2,4-di-t-butylphenyl) phosphite; cyclic neopentane tetra-yl bis (2,4-di-t-butylphenyl)phosphite; cyclic neopentane tetra-yl bis(2,6-di-t-butyl-4-methylphenyl)phosphite; and 2,2-methylene bis (4,6-di-t-butylphenyl)octyl phosphite.

To the above invention thermoplastic norbornane-type resins may further be added, in addition to the above antioxidants, as needed, UV absorbers such as p-t-butylphenyl salicylate, 2,2'-dihydroxy-4-methoxybenzophenone, 2,4-dihydroxybenzophenone, 2-hydroxy-4-methoxybenzophenone, 2-(2'-dihydroxy-4'-m-octoxyphenyl) benzotriazole; stabilizers; antistatic agents; flame retardants; elastomers for improving impact resistance; and the like. An additive, such as a lubricant, may also be added for improving processability. The thermoplastic norbornane-type resin may be made into films which are used in this invention by molding methods known in the art, such as injection molding, extrusion molding, compression molding, solution casting, and the like. The thickness of the invention film, which is not particularly limited, should be normally 0.005–2 mm, preferably 0.01–0.5 mm.

The liquid crystal display panel of this invention is such that a single sheet of film can perform at least two functions among those including a transparent conducting film, a protective film for a polarizing film, a phase retardation film, a color filter, a light guide sheet, a light diffusion sheet, and a light condensing sheet that constitutes the panel, specifically for example, those described in detail below: a polarizing film having a phase retardation function, a transparent conducting polarizing film, a transparent conducting film having a phase retardation function, a polarizing film having a light condensing function and/or a light diffusion function, a light guide sheet having a light reflecting function, a light guide sheet having a light condensing function or a light diffusion function, and an optical film which performs both a light diffusion function and a light condensing function.

A polarizing film having a phase retardation function can be used as a film for the construction of a liquid crystal display panel of this invention. A polarizing film is defined as a film performing the function of separating incident light into two polarized light components which are mutually orthogonal so as to transmit one of the components, thereby absorbing or dispersing the other component, and it comprises three layers in a conventional construction consisting of a polarizer membrane having protective films laminated to both sides thereof; but the polarizing film having a phase retardation function in this invention is one in which at least one of such protective films also has a function as a phase retardation film. The function of a phase retardation film is that which changes the relative phase of the light component polarized by the polarizing film.

The types of polarizing membranes used in the polarizing film having the above phase retardation function are not particularly limited as long as they have a function as a polarizer. They, for example, include a PVA/iodine-type polarizer membrane, a dye-type polarizer membrane of a PVA-type film having an adsorbed and oriented dichroic dye, a polyene type polarizer membrane generated by inducing dehydration of a PVA-type film or dehydrochlorinating a polyvinyl chloride film, and a polarizer membrane of a modified PVA type film having cationic groups in the molecule, which contains a dichroic dye in the film surface and/or bulk.

The method for manufacturing the polarizer membrane is not particularly limited, either. For example, a method known in the art may be mentioned including a method of stretching a PVA-type film followed by having iodide ions adsorbed therein, a method of dyeing a PVA film having a dichroic dye followed by stretching, a method of stretching a PVA-type film followed by dyeing with a dichroic dye, a method of printing a PVA-type film with a dichroic dye followed by stretching, a method of stretching a PVA-type film followed by printing with a dichroic dye, and the like. Specifically, these processes include a method of manufacturing a polarizer membrane which calls for dissolving iodine in a potassium iodide solution to generate complex polyiodide ions and having these ions adsorbed by a PVA film, followed by immersing in 1–4% by weight aqueous boric acid solution at a bath temperature of 30°–40° C.; and a method of manufacturing a polarizer membrane which calls for similarly treating the PVA film in boric acid, stretching uniaxially to a stretch ratio of 3–7, immersing in an aqueous solution containing 0.05–5% by weight of a dichroic dye at a bath temperature of 30–40° C. to cause adsorption of the dye, followed by drying at 80–°100° C. for heat setting.

A protective film having a phase retardation function can be obtained by stretch-orienting or surface pressing a film made of the thermoplastic norbornane-type resin. A pre-stretching sheet should be usually 25–500 μm, preferably 50–400 μm, more particularly 100–300 μm thick.

A known uniaxial stretching method may be used as the method of stretching, including, for example, a tenter transverse uniaxial stretching, compression stretching between rolls, uniaxial stretching in the machine direction using rolls with different circumferential rates, and the like. A biaxial stretching may be used which involves stretching to a range that does not affect molecular orientation, followed by uniaxially stretching for molecular orientation.

The film obtained in the above manner is molecularly oriented by the stretching to have a certain retardation value, where the retardation can be controlled by the retardation of the sheet prior to stretching, the stretch ratio, the stretch temperature, and the thickness of the stretch-oriented film. For a prestretching sheet having a given thickness, the higher the stretch ratio for the film, the greater the tendency to have a larger absolute value for retardation, so that varying the stretch ratio permits the formation of a stretch-oriented film having the desired retardation.

A selection is made of a film obtained by the above method in this invention which has a measured value of retardation by a polarizing microscope of 5–900 nm; although the preferred range of retardation differs, respectively, depending upon the type or configuration of the liquid crystal display panel, for example, the polarizing film used in a TFT type liquid crystal display panel is required to be particularly highly transparent; and a lower retardation is preferred for a greater angle of visual field; hence, it is preferred to use an optically uniform film having a retardation as low as 10–80 nm.

If both protective films to be laminated onto two sides of the polarizer membrane in a polarizing film also perform a function as a phase retardation film, the total retardation values of the two protective films is preferably 5–900 nm and 10–80 nm in the case of a TFT type liquid crystal display panel application. The retardation values of these respective films may be identical to or different from each other, but preferably they are the same for the simplicity of production steps. Protective films which also act as phase retardation films, when laminated onto both sides of a polarizer membrane, may be laminated thereto with the optical axes of the films aligned with each other, or laminated with optical axes at a certain angle according to their objective.

When either one of the protective films performs a combined function also as a phase retardation film, the film preferably has a retardation value in the range of 5–900 nm, or 10–80 nm for a TFT type liquid crystal display application. The smaller the variation in the retardation value, the better, with the retardation variation being preferably not more than ±20 nm at a wavelength of 550 nm, or in terms of total variation in the case of a plurality of protective films that also act as phase retardation films.

If only one of the protective films also functions as a phase retardation film in the above polarizing film, the other protective film having no phase retardation function should be a film made of the above thermoplastic norbornane-type resin which is a 5–500 μm optically uniform and low retardation transparent film.

A protective film made of a thermoplastic norbornane-type resin having a phase retardation function and a protective film not having the retardation function may be laminated onto a polarizer membrane of a polarizing film using a bonding agent or adhesive. Such bonding agents and adhesives are preferably highly transparent, specifically natural rubber, synthetic rubber, vinyl acetate/vinyl chloride copolymer, polyvinyl ether, acrylics, modified polyolefin types, and curable bonding agents containing a curative, such as an isocyanate, and the like, and dry lamination type adhesive which calls for mixing a polyurethane-type resin solution with a polyisocyanate type resin solution, synthetic rubber adhesives, epoxy-type adhesives, and the like.

A transparent conducting polarizing film can be used as a film which constitutes the liquid crystal display panel of this invention. The transparent conducting polarizing film is a film further having formed a transparent electrode on one of the protective films laminated onto both sides of a polarizer membrane. The same aforementioned polarizer membrane can be used herein.

A protective film to be laminated onto the aforementioned polarizer membrane in the transparent conducting polarizing film may be a transparent film having about 5–500 μm, preferably 10–30 μm, more particularly 20–200 μm, which is optically uniform and of low retardation, but it is preferred for at least the protective film on which the transparent electrode is provided, particularly both protective films laminated onto the two sides of the polarizer membrane to have a light transmittance of at least 90%, a heat distortion temperature of at least 100° C. and a water absorption of not more than 1.0% when held for 24 hours in water at 23° C., and a surface hardness in terms of a pencil hardness of H or harder.

A film having a light transmittance less than 90% will give a polarizing film poor clarity which would form a dark and cloudy image when used in a display. A film having a heat distortion temperature less than 100° C. may be distorted when subjected to heat during the formation of the transparent electrode or to a heat applied to the polarizing film which has been cut into a desired size when its periphery is sealed. A film having a water absorption exceeding 1.0% when held for 24 hours in water at 23° C. has poor moisture resistance as a protective film. Therefore, such a polarizer membrane, if coming in contact with water, may have a greater chance of decreasing its polarizer performance. A film having a low surface hardness tends to become scratched during the manufacture of devices, so that, for example, when used in liquid crystal displays, the display performance or appearance of the display may be adversely affected. It is extremely difficult, in terms of manufacturing technology, to completely prevent any scratches which may be generated during the manufacture of a display, through a plurality of different steps, thus creating extra cost problems. Therefore, it is preferred to use a high surface hardness film as a protective film, so as to prevent the polarizing film from being scratched during display manufacture, specifically calling for a film having a pencil hardness of H or harder.

The aforementioned bonding agents or adhesives may be used in the lamination of a thermoplastic norbornane-type resin protective film to the polarizer membrane of the polarizing film.

The transparent conducting polarizing film of this invention is obtained by forming a transparent electrode on one of the polarizer membrane protective films of the polarizing film as obtained in the aforementioned manner.

Materials used to form the transparent electrode include, generally, metals, such as Sn, In, Ti, Pb, Au, Pt, Ag, and the like, or their oxides; if elemental metal is formed on a substrate board by the aforementioned method, optionally it may be oxidized later. It is possible to attach and form an oxide layer at the outset, but it is also possible to first generate it in the form of an elemental metal or a lower oxide, followed by an oxidation treatment, such as oxidation with heat, anodic oxidation, liquid phase oxidation, or the like, to render the layer transparent.

These transparent electrodes are shaped into sheets, films, and the like, and are then adhered to shaped articles or generated on shaped articles by plasma polymerization, sputtering, vacuum deposition, plating, ion plating, spraying, electrolytic deposition, and the like. These transparent electrode are usually 10–10,000 angstroms, preferably 50–5,000 angstroms thick and preferably have a specific resistivity of not more than 100 Ωcm.

It may be permissible in this invention to form optionally an adhesive layer between the protective film and the transparent electrode, as well as an anchor coat layer therebetween to improve the contact with the transparent electrode and to level the film. Such adhesive layers include, for example, heat resistant resins, such as epoxy resins, polyimides, polybutadiene, phenolic resins, polyether ether ketones, and the like. The anchor coat layer used should contain so-called acrylic prepolymers, such as epoxy diacrylates, urethane diacrylates, polyester diacrylates, and the like, in the component. Procedures known in the art can be used for curing, such as curing with UV or with heat, and the like. In addition to the method of forming a transparent electrode on a transparent conducting polarizing film, the film used as a protective film for the polarizer membrane may have a preformed transparent electrode, which may be then fabricated on the surface of the polarizer membrane using the aforementioned adhesive means.

A transparent conducting film having a phase retardation function may be used as a film for the construction of the liquid crystal display panel of this invention. Such a transparent conducting film having a phase retardation function can be obtained by providing the aforementioned thermoplastic norbornane resin film having a phase retardation function by stretching the film or surface pressing by the above-mentioned method, followed by forming a transparent electrode on the film by the above method.

A film having both a light condensing function and a light diffusion function can be used as a film to construct the liquid crystal display panel of this invention. Such a film can be obtained respectively by forming one side of the above thermoplastic norbornane resin film on a pattern of a configuration having a light condensing function and then forming on the other side a pattern of a configuration having a light diffusion function. The light condensing function is imparted by forming a specific light condensing pattern by embossing the surface of the film or by coating the surface with a UV curable resin. The light diffusion function can be imparted by a method of forming a specific diffusion pattern by embossing the surfaceof the film or by coating the surface with a UV curable resin, or else by applying a variety of coating agents, such as a coating agent obtained by dispersing an inorganic or organic pigment in an organic solvent.

A polarizing film having a light condensing function and/or a light diffusion function can be used as a film to construct the liquid crystal display panel of this invention. Such a polarizing film can be obtained by using for one of the protective films to be laminated onto both sides of the polarizer membrane a film having a light condensing function and/or a light diffusion function. The protective film which is made of the above thermoplastic norbornane resin can be provided with a light condensing function or a light diffusion function using the aforementioned method. It may be permissible to use as the protective film a film having both of the above light condensing function and light diffusion function.

The resultant protective film having a light condensing function and/or a light diffusion function is adhered to the polarizer membrane by the aforementioned method and a conventionally-known protective film which has no light condensing function and/or a light diffusion function is adhered to the side opposite to that with said adhered protective film of the polarizer membrane, thereby resulting in a polarizing film having a light condensing function and/or a light diffusion function.

A light guide sheet having a light reflecting function may be used as a film to construct the liquid crystal display panel of this invention. Such a light guide sheet is obtained by forming a light reflecting layer on the surface of a transparent substrate board generated by injection molding, injection-compression molding, or extruding the above thermoplastic norbornane resin. There are no particular limitations as to the methods of forming the light reflecting layer, which may be obtained by coating or printing a coating used in the light reflecting layer over the entire surface of the light guide sheet, or may be obtained by printing a pattern having any desired shape, area, distribution, for example, dots, lines, and comb-shapes, thereby providing the light guide sheet with constant luminance independent of where the light source is located. The coating used in the light reflecting layer is preferably a white pigment mainly comprising an inorganic content, such as titanium oxide, or the like.

Covering side surfaces other than the light incident surface of the light guide sheet with the above white coating or a mirror-like reflecting layer can prevent the light from escaping, which enables the luminance to be improved.

The resultant light guide sheet thickness is not particularly limited, but it is preferably in the range of 0.05–5mm.

The light reflecting sheet may be laminated onto the surface of the above light conducting sheet, on which a light reflecting layer is fabricated. The type of light reflecting sheet is not particularly limited, permitting the use of a plastic resin into which a pigment, such as titanium oxide, barium sulfate, calcium carbonate, aluminum hydroxide, magnesium carbonate, or aluminum oxide has been incorporated and which has been shaped on a film or sheet, or else a foamed sheet therefore may be used.

It is also possible to use a mirror like reflecting sheet, such as sheet metals of aluminum, gold, or the like, or a sheet with a metal gloss obtained by plating or vapor deposition, and the like.

The type of plastic sheet used from among those used as the above light reflecting sheet, is not particularly limited as described above, but it is preferred to use a sheet made of a material containing a thermoplastic norbornane resin in that it has excellent heat resistance and moisture resistance and does not undergo distortion or delamination from the light guide sheet with heat or water under aggressive conditions, such as high temperature and high moisture, thereby providing high reliability.

The light source for such a light guide sheet may be a conventional one, preferably one, or a plurality of lamps, or cold cathode tubes mounted on one side or both sides of the light guide sheet.

A light guide sheet having a light condensing function or a light diffusion function can be used as a film for the construction of the liquid crystal display panel of this invention. Such a light guide sheet may be obtained by forming a pattern having the above light condensing function or light diffusion function on the surface of a transparent substrate obtained by injection molding, injection compression molding, or extruding the aforementioned thermoplastic norbornane resin by embossing or coating the surface with a curable resin by light such as UV, followed by curing; the coating agent may be provided with a light diffusion function; if a mold is used, the surface of the mold may be preformed with a desired pattern, so as to permit transferring the pattern at the same time that the light guide sheet is fabricated. The resultant light guide sheet is not particularly limited in terms of thickness, but it is preferably in the range of 0.05–5 mm.

A light reflecting layer may be fabricated on the above light guide sheet on the side opposite to that on which the pattern having a light diffusion function or light condensing function has been formed, using the aforementioned method of formation.

The liquid crystal display panel of this invention can be used in portable telephones, digital information terminals, pocket pagers, liquid crystal displays mounted on vehicles, such as navigation systems, liquid crystal monitors, light control panels, display panels for OA [Office Automation] appliances, display panels for AV [Audio/Video] appliances, and the like.

EXAMPLES

Examples of this invention are now described below, but the present invention is not limited to these examples. Parts and percentages in these examples are based on weight unless otherwise noted.

Measurements in these examples have been made by the following methods:
Film Thickness ($\mu$m)
Measured by a dial type thickness gauge. Luminance of Liquid Crystal Display Panel ($cd/m^2$).

In accordance with JIS C-7614, a light detector was mounted in front of a liquid crystal display panel and measurement was made by turning on the light source for the liquid crystal dispaly panel.
Surface Image Sharpness The sharpness of the display image obtained by operating a liquid crystal display panel was rated according to the following rating standard:

O: Distortion-free and sharp image

X: Either distorted or dark image.

Moisture Resistance

Luminance was measured after a liquid crystal display panel was held for 1,000 hours under the conditions of 80° C. and a relative humidity of 90% and the extent of the loss of luminance was compared before and after the moisture resistance test, with the rating given according to the following rating standard:

O: Luminance exceeding 90% of pre-moisture resistance test level

Δ: Luminance in the range of 70–90% of pre-moisture resistance test level

X: Luminance less than 70% of pre-moisture resistance test level Synthetic Example 1 (Preparation of Thermoplastic Norbornane Resin)

To an autoclave with a 1 litter internal volume were added 100 g of 8-methyl-8-methoxycarbonyl tetracyclo [$4.4.0.1^{2,5}.1^{7,10}$]dodeca-3-ene, 60 g of 1,2-dimethoxyethane, 240 g of cyclohexane, 9 g of 1-hexene, and 3.4 ml of a toluene solution containing 0.96 moles of diethylaluminum chloride/l.

In another flask, 20 ml of a 1,2-dimethoxyethane solution of 0.05 moles/l of tungsten hexachloride and 10 ml of a 1,2-dimethoxyethane solution of 0.1 mole/l of paraldehyde were mixed 4.9 ml of the mixed solution was added to the mixture in the autoclave. The autoclave was closed and the mixture was heated to 80° C. under stirring for four hours.

To the resultant polymer solution was added a 2/8 (weight ratio) mixed solvent of 1,2-dimethoxyethane and cyclohexane to bring the polymer/solvent ratio to 1/10 (weight ratio), followed by adding 20 g of triethanolamine and stirring for 10 minutes.

500 g of methanol was added to the polymer solution, followed by stirring for 30 minutes. The solution was then allowed to stand. The solution was separated into two layers from which the top layer was removed, followed by adding and stirring with methanol, allowing it to stand, and removing the top layer. The same operation was repeated twice and the resultant bottom layer was suitably diluted with cyclohexane and 1,2-dimethoxyethane to yield a cyclohexane-1, 2-dimethoxyethane solution of a 10% polymer concentration.

The solution was allowed to react in an autoclave in the presence of 20 g of palladium/silica magnesia [a product of Nikki Kagaku K. K., palladium content is 5%] under a hydrogen pressure of 40 kg/cm² for four hours at 165° C. This was followed by filtering off the hydrogenation catalyst to give a hydrogenated polymer solution.

The hydrogenated polymer solution was added with 0.1%, with respect to the hydrogenated polymer, of the antioxidant, pentaerythrityl-tetrakis [3-(3,5-di-t-butyl-4-hydroxyphenyl) propionate], followed by removing the solvent at reduced pressure at 360° C. The molten resin was pelletized by an extruder in a nitrogen atmosphere to obtain a thermoplastic resin ("thermoplastic resin A") having a weight average molecular weight of $7.0 \times 10^4$ and an extent of hydrogenation of 99.5%, and a glass transition temperature of 168° C.

PREPARATION EXAMPLE 1

(Procedure for Preparing Film)

A 20% by weight toluene solution of the thermoplastic resin A obtained in Synthetic Example 1 was casted through a die to give a uniform thickness solution which was dried at 200° C. to give a 100 μm thick cast film.

PREPARATION EXAMPLE 2

(Procedure for Preparing Films Having a Phase Retardation Function)

A cast film was obtained in a manner similar to that of Preparation Example 1 using the thermoplastic resin A obtained in Synthetic Example 1, except for changing the die width so as to allow the dried film thickness to exceed 100 μm. The film was uniaxially stretched at a temperature of 170° C. at such a stretch ratio so as to bring the post-stretched film thickness to 100 μm, thereby generating a 100 μm thick stretched film.

PREPARATION EXAMPLE 3

(Preparation of Polarizer Membrane)

A 50 μm thick polyvinyl alcohol film was uniaxially stretched while being immersed in a 40° C. bath comprising 5.0 g of iodine, 250 g of potassium iodide, 10 g of boric acid, and 1,000 g of water to a stretch ratio of 4 in about 5 minutes. The resultant film under tension was surface cleaned with alcohol followed by air drying to give a polarizer membrane.

PREPARATION EXAMPLE 4

(Preparation of Transparent Conducting Film)

(a) Transparent Conducting Film Having No Phase Retardation Function.

A transparent conducting film was obtained by forming a transparent electrode onto one side of the film prepared in Preparation Example 1 by sputtering method using a target comprising indium oxide/tin oxide (weight ratio 95:5).

(b) Transparent Conducting Film Having a Phase Retardation Function. A transparent electrode similar to that of Preparation Example 4(a) was generated by sputtering onto one side of the film obtained in Preparation Example 2 thereby producing a transparent conducting film.

PREPARATION EXAMPLE 5

(Preparation of Film Having a Light Condensing Function)

A surface of the film obtained in Preparation Example 1 was coated with a UV curable type resin composition having the composition given below, using an applicator with a 50 μm clearance. Then, a stamper with a minute crenulated pattern was pressed against the UV curable resin composition, followed by irradiating it with UV light at 1 J/cm² from the film side for curing. After curing, the stamper was peeled off to generate a film having a minute crenulated pattern on the surface.

UV Curable Resin Composition Epoxy Acrylate 60 g (a product of Kyoeisha Yushi Kagaku Kogyo, Epoxyester 3002A) Trimethylolpropane Triacrylate 25 g (a product of Toa Gosei Kagaku Kogyo, Aronix M-309) Acrylic Acid 15 g (a product of Osaka Yuki Kagaku Kogyo) Photoinitiator 4 g (a product of Ciba Geigy, Irgacure 184)

PREPARATION EXAMPLE 6

(Preparation of Film Having a Light Diffusion Function)

A 100 μm thick embossed film having an embossing depth of 30 μm on the surface of the film fabricated in Preparation Example 1 was obtained by passing the film through an embossing roll and a processing roll.

PREPARATION 7

(Preparation of Film Having a Light Condensing Function and a Light Diffusion Function)

The UV curable type resin composition used in Preparation Example 5 was coated onto a side opposite to the side (embossed surface) having the light diffusion function of a film having a light diffusion function obtained in Preparation Example 6, thereby forming a minute crenulated shaped pattern on the surface thereof by the same method as that used in Preparation Example 5 to generate a film having both a light condensing function and a light diffusion function.

PREPARATION EXAMPLE 8

(Preparation of Light Guide Sheet)

A 1 mm thick light guide sheet was molded from the thermoplastic resin A prepared in Synthetic Example 1 by a commercial injection molder provided with a mirror-finished mold at a resin temperature of 320° C and a mold temperature of 130° C. One side of the light guide sheet was coated over the entire surface with a white titanium oxide pigment to form a light reflecting layer.

EXAMPLE 1

The film prepared in Preparation Example 1 was laminated to one side of the polarizer membrane obtained in Preparation Example 3 using a bonding agent obtained by mixing 100 parts by weight of an acrylic resin from 90% by weight of n-butyl acrylate, 7% by weight of ethyl acrylate, and 3% by weight of acrylic acid with 2 parts of a crosslinker comprising 75% by weight of an ethyl acetate solution of an adduct of tolylene diisocyanate (3 moles) with trimethylolpropane (1 mole); the film having a phase retardation function obtained in Preparation Example 2 was laminated onto the other side of the polarizer membrane using the same bonding agent, thereby generating a polarizing film having a phase retardation function.

Two sheets of the transparent conducting film prepared in Preparation Example 4(a) were adhered together with the transparent electrode sides facing each other via spacer therebetween using an adhesive composition comprising a urethane-type adhesive (Takerac A-371, a product of Takeda Yakuhin Kogyo K. K.) and a curative (Takenate A-10, a product of Takeda Yakuhin Kogyo K. K.). The spacer used was prepared by casting a solution of 10 parts of the thermoplastic polymer A prepared in Synthetic Example 1 dissolved in 700 parts of toluene to give a 20 $\mu$m thick film followed by cutting out the center portion, leaving a 5 mm width from the periphery. After adhesion, methoxy benzylidene-butyl aniline liquid at 30° C. was injected between the films through the needle of a syringe so as not to leave any air inside, to fabricate a liquid crystal cell.

This liquid crystal cell was adhered using the aforementioned adhesive to the side of the film having a phase retardation function of the above polarizing film. Onto the other side of the liquid crystal cell were laminated in sequence a polarizing film obtained by laminating, with the above bonding agent, the film prepared in Preparation Example 1, to both sides of the polarizer membrane prepared in Preparation Example 3; the light condensing film prepared in Preparation Example 5; the light diffusion film obtained in Preparation Example 6; and light guide sheet prepared in Preparation Example 8. The light guide sheet was positioned so that the white coating coated side was on the outside. A cold cathode tube light source was attached to one of the sides of the light guide sheet of the resultant laminate to generate a liquid crystal display panel.

The liquid crystal display panel was then evaluated for panel luminance, display image sharpness, and panel moisture resistance. The results of the evaluation are given in Table 1.

EXAMPLE 2

A polarizing film was obtained by laminating the film prepared in Preparation Example 1 using the same bonding agent as that used in Example 1 onto both sides of the polarizer membrane prepared in Preparation Example 3.

Separately, the transparent conducting film obtained in Preparation Example 4(a) was adhered via spacer using the adhesive used in Example 1 to the transparent conducting film having a phase retardation function prepared in Preparation Example 4(b) with the transparent electrode sides facing each other. After adhesion, methoxybenzylidene-butylaniline was injected in a manner similar to that of Example 1 to fabricate a liquid crystal cell.

The side of the film having a phase retardation function of the liquid crystal cell was adhered to the above polarizing film using the above adhesive; to the other side of the liquid crystal cell were laminated in sequence a polarizing film having the same structure as the above, the light condensing film prepared in Preparation Example 5, the light diffusion film prepared in Preparation Example 6, and the light guide sheet prepared in Preparation Example 8; a light source was positioned to the resultant laminate as in the case of Example 1 to obtain a liquid crystal display panel.

The liquid crystal display panel was evaluated in a manner similar to that of Example 1. The results of the evaluation are given in Table 1.

EXAMPLE 3

The film obtained in Preparation Example 1 was laminated, using the same bonding agent as that used in Example 1, to one side of the polarizer membrane prepared in Preparation Example 3; onto the other side was laminated the transparent conducting film prepared in Preparation Example 4(b), whereby a transparent conducting polarizing film was fabricated. The polarizer membrane was adhered in this case to the side opposite to the side to which the transparent electrode of the transparent conducting film had been laminated.

A transparent conducting polarizing film was fabricated in a manner similar to the above except for replacing the transparent conducting film of Preparation Example 4(b) with the transparent conducting film prepared in Preparation Example 4(a).

These two transparent conducting polarizing films were adhered together using the same adhesive used in Example 1 via the same spacer as that of Example 1 with the transparent electrode sides facing each other. After adhesion, methoxybenzylidene-butylaniline was injected in a manner similar to that of Example 1 to fabricate a liquid crystal cell.

To this liquid crystal cell were laminated in sequence, in a manner similar to that of Example 1, the light condensing film obtained in Preparation Example 5, the light diffusion film obtained in Preparation Example 6, and the light guide sheet obtained in Preparation Example 8, thereby generating a laminate having laminated in sequence the protective film/polarizer membrane/transparent conducting film having a phase retardation function/liquid crystal (methoxybenzylidene-butyl aniline)/transparent conducting film having no phase retardation function/polarizer membrane/protective film/light condensing film/light diffusion film/light guide sheet, followed by attaching a cold cathode tube light source to one side of the light guide sheet of the laminate, thereby generating a liquid crystal display panel.

The liquid crystal display panel was evaluated in a manner similar to that of Example 1. The results of the evaluation are given in Table 1.

EXAMPLE 4

A polarizing film was obtained by laminating the film prepared in Preparation Example 1 using the same bonding agent as that used in Example 1 to both sides of the polarizer membrane prepared in Preparation Example 3.

The film having a phase retardation function obtained in Preparation Example 2 was laminated onto one side of the polarizing film followed by laminating thereto the liquid crystal cell used in Example 1.

Separately, the film obtained in Preparation Example 1 was laminated to one side of the polarizer membrane obtained in Preparation Example 3, and the light condensing film obtained in Preparation Example 5 laminated to the other side so as to bring the side opposite from the light condensing pattern surface into the adhered lap-surface, thereby generating a polarizing film having a light condensing function.

The polarizing film having the light condensing function was aminated to the liquid crystal cell with the light condensing film side on the outside. This was followed by laminating, to the light condensing film side, in sequence the light diffusion film obtained in Preparation Example 6 and the light guide sheet obtained in Preparation Example 8, resulting in a laminate, to which a light source in a manner similar to that of Example 1 was attached to give a liquid crystal display panel.

The liquid crystal display panel was then evaluated in a manner similar to that of Example 1. The results of the evaluation are given in Table 1.

EXAMPLE 5

The film obtained in Preparation Example 1 was laminated to both sides of the polarizer membrane obtained in Preparation Example 3 using the same bonding agent as that used in Example 1 to give a polarizing film.

The film having a phase retardation function obtained in Preparation Example 2 was laminated to one side of the polarizing film, followed by laminating thereto the same liquid crystal cell as that used in Example 1. To the other side of the liquid crystal cell were laminated, in sequence, the polarizing film obtained by laminating the film obtained in Preparation Example 1 to both sides of the polarizer membrane obtained in Preparation Example 3 using the aforementioned bonding agent, the film having a light condensing function and a light diffusion function obtained in Preparation Example 7, and then the light guide sheet obtained in Preparation Example 8. A light source was attached to the resultant laminate in a manner similar to that of Example 1 to give a liquid crystal display panel.

The liquid crystal display panel was then evaluated in a manner similar to that of Example 1. The results of the evaluation are given in Table 1.

EXAMPLE 6

A UV curable type resin composition having the same composition as that used in Preparation Example 5 was coated onto the side opposite to the light reflecting layer of the light guide sheet obtained in Preparation Example 8.

This was followed by pressing a stamper with a minute crenulated pattern against the UV curable resin composition and then irradiating it with UV light at 1 J/cm² from the film side for curing. After curing, the stamper was peeled off to give a light guide sheet having on the surface a light diffusion pattern with a minute crenulated pattern.

To the light diffusion patterned surface of the light guide sheet were laminated in sequence the light condensing film obtained in Preparation Example 6, the polarizing film obtained by laminating the film obtained in Preparation Example 1 to both sides of the polarizer membrane obtained in Preparation Example 3 using the aforementioned bonding agent, the same liquid crystal cell as that used in Example 1, and the film having a phase retardation function obtained in Preparation Example 2, further followed by laminating the polarizing film obtained by laminating the film obtained in Preparation Example 1 to both sides of the polarizer membrane obtained in Preparation Example 3, thereby generating a laminate. A light source was attached to the laminate in a manner similar to that of Example 1 to give a liquid crystal display panel.

The liquid crystal display panel was then evaluated in a manner similar to that of Example 1. The results of the evaluation are given in Table 1.

EXAMPLE 7

The film obtained in Preparation Example 1 was laminated to one side of the polarizer membrane obtained in Preparation Example 3 using the same bonding agent as that of Example 1, followed by laminating the film having a phase retardation function obtained in Preparation Example 2 to the other hereof, thereby generating a polarizing film having a phase retardation function.

The polarizing film was adhered on its film side having a phase retardation function to the liquid crystal cell used in Example 1 with the adhesive used in Example 1; the polarizing film having a light condensing function used in Example 4 was laminated to the other side of the liquid crystal cell so as to have the light condensing film side to be outside, followed by adhering the light guide sheet used in Example 6 to the side of the light condensing film so as to bring the light diffusion patterned surface to the adhered lap-surface using the adhesive used in Example 1 to give a laminate, to which a light source was attached in a manner similar to that of Example 1 to obtain a liquid crystal display panel.

The liquid crystal display panel was evaluated in a manner similar to that of Example 1. The results of the evaluation are given in Table 1.

EXAMPLE 8

The film obtained in Preparation Example 1 was laminated to one surface of the polarizer membrane obtained in Preparation Example 3 using the same bonding agent as that used in Example 1, followed by laminating the transparent conducting film obtained in Preparation Example 4(b) to the other side thereof, thereby generating a transparent conducting polarizing film.

In this case the polarizer membrane was adhered to the side opposite to that to which the transparent electrode of the transparent conducting film had been laminated.

Separately, the transparent conducting film obtained in Preparation Example 4(a) was laminated to one side of the polarizer membrane obtained in Preparation Example 3, and the light condensing film obtained in Preparation Example 5 was laminated to the other side, thereby fabricating a transparent conducting polarizing film having a light condensing function.

These two transparent conducting polarizing films were adhered together with the transparent electrode sides facing each other, via spacer similar to that used in Example 1 with the same adhesive as that used in Example 1. After adhesion, methoxybenzylidene-butyl aniline was injected in a manner similar to that of Example 1 to fabricate a liquid crystal.

The light guide sheet used in Example 6 was adhered to the light condensing film side of the liquid crystal cell so that the light diffusion patterned surface was on the adhered lap-surface to give a laminate, to which a light source was attached in a manner similar to that of Example 1 to give a liquid crystal display panel.

The liquid crystal display panel was evaluated in a manner similar to that of Example 1. The results of the evaluation are given in Table 1.

COMPARATIVE EXAMPLE 1

100 μm thick triacetyl cellulose film (tradename, Fujitac, a product of Fuji Film K. K.) was laminated to both sides of the polarizer membrane obtained in Preparation Example 3 using the same bonding agent as that used in Example 1, thereby generating a polarizing film.

A phase retardation film molded in a manner similar to that of Example 2, except for using polycarbonate film (trade name, Panlite, a product of Teijin Kasei K. K.), was laminated to the polarizing film.

A liquid crystal cell was fabricated in a manner similar to that of Example 1 except for using a transparent conducting film prepared in a manner similar to that of Preparation Example 4 except for using a polyarylate film (tradename, Elmec, a product of Kanegafuchi Kagaku Kogyo K. K.).

The liquid crystal cell was adhered to the above phase retardation film to the side opposite to that to which the polarizing film had been adhered, using the same adhesive as that used in Example 1. A polarizing film having the same construction was laminated onto the opposite side of the liquid crystal. This was followed by laminating in sequence thereto a light condensing film molded in a manner similar to that of Preparation Example 5 except for using polycarbonate film, a light diffusion film molded in a manner similar to that of Preparation Example 6 except for using polycarbonate film, a light guide sheet obtained in a manner similar to that of Preparation Example 8, except for using polymethyl methacrylate resin at a resin temperature of 230° C. and a mold temperature of 100° C., to give a laminate, to which a light source was attached in a manner similar to that of Example 1 to give a liquid crystal display panel.

The liquid crystal display panel was then evaluated in a manner similar to that of Example 1. The results of the evaluation are given in Table 1.

COMPARATIVE EXAMPLE 2

Polycarbonate film (tradename, Panlite, a product of Teijin Kasei K. K.) was laminated to one side of the polarizer membrane obtained in Preparation Example 3, followed by laminating a transparent conducting film obtained in a manner similar to that of Preparation Example 4(b) except for using polycarbonate film to the other side, thereby generating a transparent conducting polarizing film having a phase retardation function.

Separately, a transparent conducting film obtained in a manner similar to that of Preparation Example 4(a), except for using polycarbonate film, was laminated to one side of the polarizer membrane obtained in Preparation Example 3 followed by laminating a light condensing film obtained in a manner similar to that of Preparation Example 5, except for using polycarbonate film, to the other side, thereby generating a transparent conducting polarizing film having a light condensing function.

These two transparent conducting polarizing films were adhered together with the transparent electrode sides facing each other by a method similar to that of Example 1 followed by injecting methoxy benzylidene-butyl aniline to fabricate a liquid crystal cell.

A light guide sheet obtained in a manner similar to that of Example 6 except for using polymethyl methacrylate was adhered to the light condensing film side of the liquid crystal so as to bring the light diffusion patterned surface to be on the adhered lap-surface using the adhesive of Example 1 to give a laminate to which a light source was attached in a manner similar to that of Example 1 to obtain a liquid crystal display panel.

The liquid crystal display panel was then evaluated in a manner similar to that of Example 1. The results of the evaluation are given in Table 1.

TABLE 1

|  | Number of Sheets in Panel | Panel Luminance [cd/m$^2$] | Display Image Sharpness | Moisture Resistance |
| --- | --- | --- | --- | --- |
| Example 1 | 11 | 137 | ◯ | ◯ |
| Example 2 | 11 | 136 | ◯ | ◯ |
| Example 3 | 9 | 140 | ◯ | ◯ |
| Example 4 | 11 | 135 | ◯ | ◯ |
| Example 5 | 11 | 136 | ◯ | ◯ |
| Example 6 | 11 | 135 | ◯ | ◯ |
| Example 7 | 9 | 141 | ◯ | ◯ |
| Example 8 | 7 | 148 | ◯ | ◯ |
| Comparative Example 1 | 12 | 110 | X | X |
| Comparative Example 2 | 7 | 130 | X | Δ |

As evident from Table 1, the liquid crystal display panels of Examples 1–8 give a high panel luminance, sharp display image, and show excellent moisture resistance.

On the other hand, Comparative Example 1, which is a conventional liquid crystal display panel construction, comprised of a large number of sheets of film, resulted in an inferior panel luminance, a dark cloudy display image, in addition, had poor moisture resistance due to the penetration of water between the component films or film delamination, and the like.

Liquid crystal display panels obtained by laminating films with a plurality of functions shaped from conventional films for use in liquid crystal display panels showed distorted images due to the birefringence of the component films or variations in birefringence and also showed decreased panel luminance because of the penetration of water between the component films or film delamination in moisture resistance tests.

The liquid crystal display panel of this invention permits practical use of films with a plurality of liquid crystal display panel functions that have not been used in practice by the conventional plastic films, by using films having high optical properties, heat resistance, moisture resistance, dimensional stability, moldability, and mechanical strength, resulting in the ability to reduce the number of films needed, the formation of a thinner and reduced weight panels, and in addition in providing excellent display image sharpness.

This application is based on U.S. Ser. No. 08/393,490 filed Feb. 24, 1995, now U.S. Pat. No. 5,516,456, and Japanese Patent Applications HEI 6-202859, HEI 6-254347, HEI 6-254348, HEI 6-254349 and HEI 6-277121 filed Aug. 4, 1994, Sep. 22, 1994, Sep. 22, 1994, Sep. 22, 1994 and Oct. 17, 1994, respectively, all incorporated herein by reference.

What is claimed is:

1. A method for improving a liquid crystal display comprising at least two films, each film having one function selected from the group consisting of transparent conductivity, protection for a polarizing film, phase retardation, color filtering, light guiding, light diffusion, light condensing, and light reflecting, the method comprising: providing a thermoplastic resin film made from a resin comprising at least one norbornane repeat unit and replacing two films in said display with the thermoplastic resin film, wherein:

said at least one norbornane repeat unit is selected from the group consisting of groups represented by formulas I–IV,

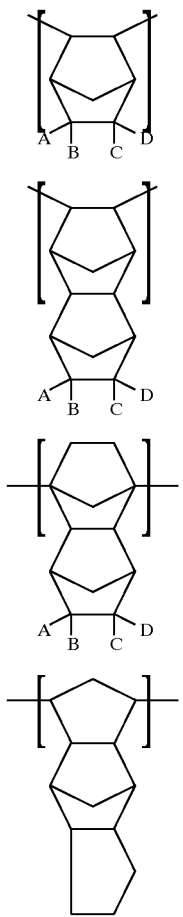

formula I formula II formula III formula IV where in formulae I–IV A–D, which may be the same or different, individually represent hydrogen, $C_{1-10}$ hydrocarbon, halogen, halogen-substituted $C_{1-10}$ hydrocarbon, $-(CH_2)_nCOOR^1$, $-(CH_2)_nOCOR^1$, $-(CH_2)_nOR^1$, $-(CH_2)_nCN$, $-(CH_2)_nCONR^3R^2$, $-(CH_2)_nCOOZ$, $-(CH_2)_nOCOZ$, $-(CH_2)_nOZ$, or $-(CH_2)_nW$, and B and C together may be $-OC-O-CO-$, $-OC-NR^4-CO-$, or form a $C_3-C_{30}$ (poly) cyclic alkylene group; $R^1$, $R^2$, $R^3$, and $R^4$ which may be the same or different are $C_{1-20}$ hydrocarbon; Z is a halogen-substituted $C_{1-20}$ hydrocarbon group; W is $SiR^5_pX_{3-p}$ where $R^5$ is a $C_{1-10}$ hydrocarbon group; X is halogen atom or $OCOR^6$ or $OR^6$ where $R^6$ represents a $C_{1-10}$ hydrocarbon group, p is an integer of 0–3; and n is an integer of 0–10; wherein said thermoplastic resin film is prepared by injection molding, extrusion molding, compression molding, or solution casting, has a thickness of 0.005 to 2 mm, and may be treated with a treatment to provide the film with at least two functions selected from the group consisting of transparent conductivity, protection for a polarizing film, phase retardation, color filtering, light guiding, light diffusion, light condensing, and light reflecting.

2. The method according to claim 1, wherein said two films replaced by said thermoplastic resin film are a protective film for a polarizing membrane and a phase retardation film.

3. The method according to claim 1, wherein said two films replaced by said thermoplastic resin film are a protective film for a polarizing membrane and a transparent conducting film.

4. The method according to claim 1, wherein said two films replaced by said thermoplastic resin film are a phase retardation film and a transparent conducting film.

5. The method according to claim 1, wherein said two films replaced by said thermoplastic resin film are a protective film for a polarizing membrane and a film with a light condensing function or light diffusion function.

6. The method according to claim 1, wherein said two films replaced by said thermoplastic resin film are a light guide sheet and a film with a light reflecting function.

7. The method according to claim 1, wherein said two films replaced by said thermoplastic resin film are a light guide sheet and a film with a light diffusion or light condensing function.

8. The method according to claim 1, wherein said two films replaced by said thermoplastic resin film are a with a light diffusion function and a film with a light condensing function.

9. The method according to claim 1, wherein the thermoplastic resin film comprises a hydrogenated polymer obtained by hydrogenating a polymer obtained by metathesis polymerization of at least one tetracyclododecene derivative represented by formula V or of said tetracyclododecene derivative with a copolymerizable unsaturated cyclic compound:

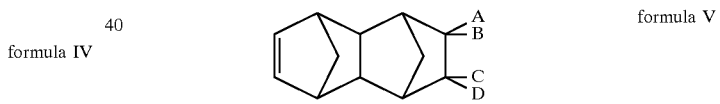

formula V where in formula V A–D, which may be the same or different, individually represent hydrogen, $C_{1-10}$, hydrocarbon, halogen, halogen-substituted $Cl_{1-10}$ hydrocarbon, $-(CH_2)_nCOOR^1$, $-(CH_2)_nOCOR^1$, $-(CH_2)_nOR^1$, $-(CH_2)_nCN$, $-(CH_2)_nCONR^3R^2$, $-(CH_2)_nCOOZ$, $-(CH_2)_nOCOZ$, $-(CH_2)_nOZ-$, or $-(CH_2)_nW$, and B and C together may be $-OC-O-CO-$, $-OC-NR^4-CO-$, or form a $C_3-C_{30}$ (poly) cyclic alkylene group; $R^1$, $R^2$, $R^3$, and $R^4$ which may be the same or different are $C_{1-20}$ hydrocarbon; Z is a halogen-substituted $C_{1-20}$ hydrocarbon group; W is $SiR^5_pX_{3-p}$ where $R^5$ is a $C_{1-10}$ hydrocarbon group; X is halogen atom or $OCOR^6$ or $OR^6$ where $R^6$ represents a $C_{1-10}$ hydrocarbon group, p is an integer of 0–3; and n is an integer of 0–10.

10. The method according to claim 9, wherein at least one of the groups A, B, C, and D in said at least one of the tetracyclododecene derivatives which is represented by formula V is $-(CH_2)_nCOOR^1$ where $R^1$ is a $C_{1-20}$, hydrocarbon group and n is 0–10.

11. A liquid crystal display as set forth in claim 9, wherein at least one of the groups A, B, C, and D in said at least one of the tetracyclododecene derivatives represented by formula V contains a methoxy-carbonyl group or ethoxy-carbonyl group.

12. The method according to claim 1, wherein said treatment includes one or more treatments selected from the group consisting of plasma polymerization, sputtering, vacuum deposition plating, ion plating, spraying, electrolytic deposition, orientation, mounting lamps or cold cathodes, embossing the resin surface, and coating a resin, organic pigment, or inorganic pigment.

* * * * *

UNITED STATES PATENT AND TRADEMARK OFFICE
CERTIFICATE OF CORRECTION

PATENT NO. : 5,833,878
DATED : November 10, 1998
INVENTOR(S) : Hironobu SHINOHARA It is certified that error appears in the above-identified patent and that said Letters Patent is hereby corrected as shown below:

Column 19, line 52, "$C_{1-10}$," should read --$C_{1-10}$--.

Column 20, line 45, "$C_{1-10}$, should read --$C_{1-10}$--.

Signed and Sealed this

Twenty-seventh Day of April, 1999

Attest:

Q. TODD DICKINSON

*Attesting Officer*      *Acting Commissioner of Patents and Trademarks*